April 9, 1940.  G. W. WHITEHURST  2,196,572
OIL OR LIQUID FUEL BURNER
Filed Dec. 1, 1937  2 Sheets-Sheet 1
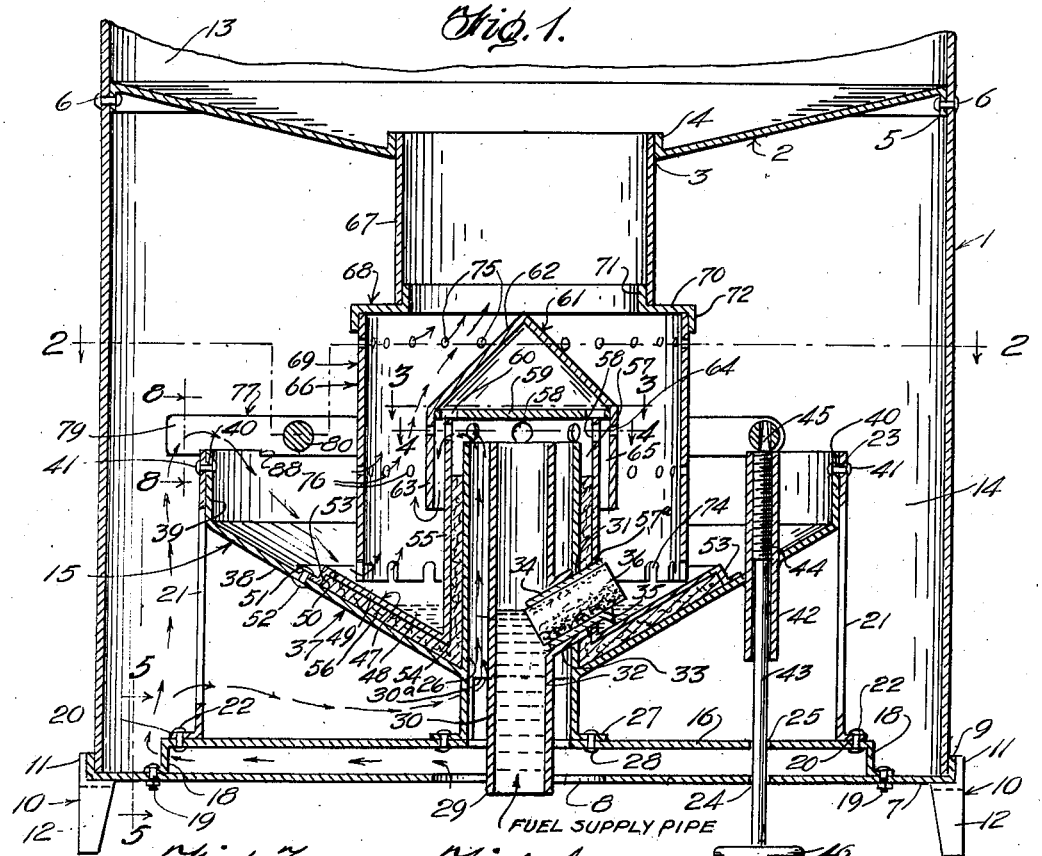
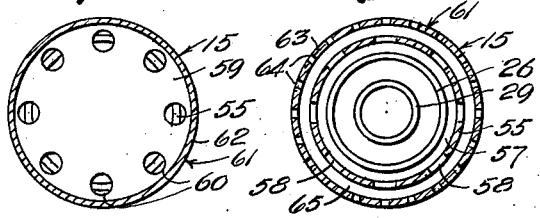
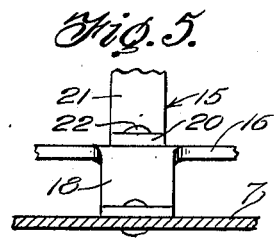
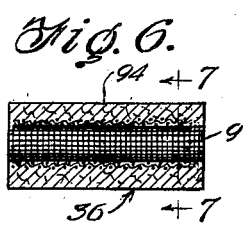
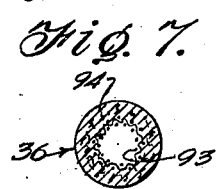
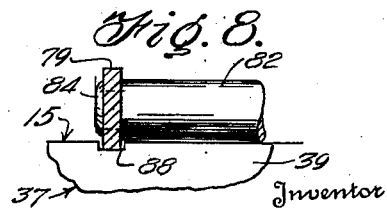
GEORGE W. WHITEHURST,
Inventor
By Kimmel & Crowell
Attorneys

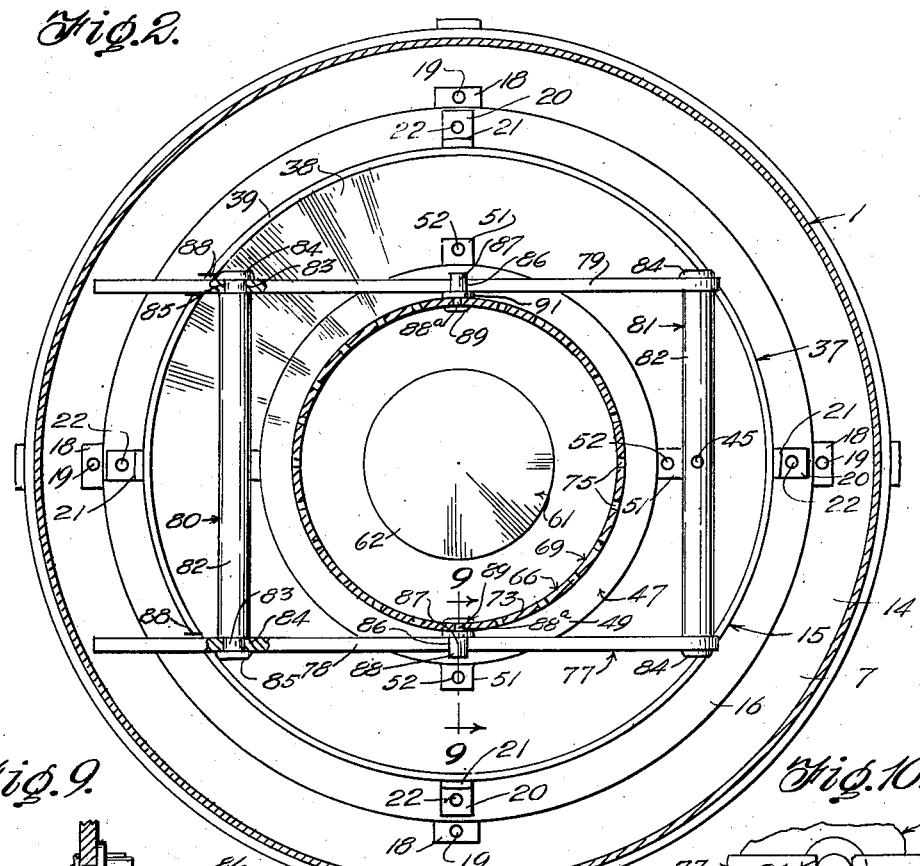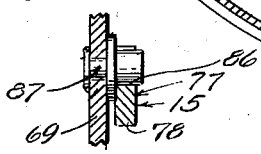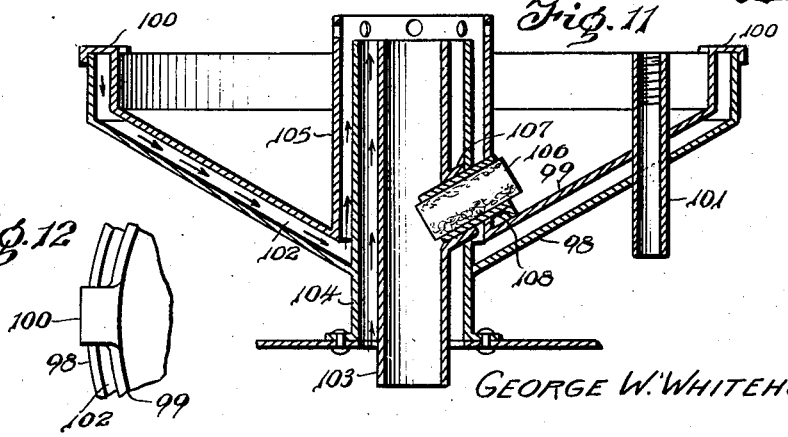

Patented Apr. 9, 1940

2,196,572

UNITED STATES PATENT OFFICE 2,196,572

OIL OR LIQUID FUEL BURNER

George W. Whitehurst, Portsmouth, Va.

Application December 1, 1937, Serial No. 177,596

12 Claims. (Cl. 158—91)

This invention relates to an oil or liquid fuel burner, which not only embodies the objects and advantages of the burner structure forming the subject matter of my co-pending application filed April 6, 1936, Serial No. 73,030, but further aims to provide, in a manner as hereinafter set forth, a burner including means to constitute an isolated and insulated combined fuel receiving and vaporizing element, whereby said means permit said vaporizing element to get very hot and not transfer its intense heat to its associate members, an isolated and insulated air conducting channel, and an isolated and insulated fuel delivery means whereby the efficiency of the operation of the burner is materially enhanced.

A further object of the invention is to provide, in a manner as hereinafter set forth, a burner of the class referred to including means to insure for a continuous flow of the required fuel feed for low fire setting whereby the latter is continuously maintained to withstand draft variations that ordinarily would snuff out the low fire, as well as for a continuous free flow of the required fuel feed for high fire setting, and to prevent the fouling of the fuel delivery means.

A further object of the invention is to provide, in a manner as hereinafter set forth, a burner of the class referred to including vertically adjustable means for determining the degree of quietness permissible with the burner.

A further object of the invention is to provide, in a manner as hereinafter set forth, a burner of the class referred to including a fuel delivery means arranged within and spaced from the wall of an externally insulated air conducting channel or flue whereby such arrangement will act to cool the fuel delivery means during the operation of the burner.

Further objects of the invention are to provide, in a manner as hereinafter set forth, an oil or fuel burner which is comparatively simple in its construction and arrangement, strong, durable, compact, adjustable, thoroughly efficient in its use, readily assembled, conveniently repaired when occasion requires, and comparatively inexpensive to manufacture.

To the above ends essentially and to others which may hereinafter appear, the invention consists of the novel construction, combination and arrangement of parts as hereinafter more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a vertical sectional view of an oil or fuel burner, in accordance with this invention, installed by way of example with respect to the lower part of the body portion of a hot water heater, Figure 2 is a section on line 2—2 Figure 1, Figure 3 is a section on line 3—3, Figure 1, Figure 4 is a section on line 4—4, Figure 1, Figure 5 is a fragmentary view in elevation illustrating a part of the base of the burner, on the line 5—5, Figure 1, Figure 6 is a longitudinal sectional view of the wick element, Figure 7 is a section on line 7—7, Figure 6, Figure 8 is a section on line 8—8, Figure 1, Figure 9 is a section on line 9—9, Figure 2, Figure 10 is a fragmentary view in elevation of the fire of burner tube element and the elevating means for the latter, Figure 11 is a vertical sectional view of a modified form of burner in accordance with this invention with the burner tube omitted, and Figure 12 is a fragmentary view in top plan of the form shown in Figure 11.

With reference to Figures 1 to 10 of the drawings, 1 generally indicates the annular casing or housing of a hot water heater. Arranged within the casing 1 above the bottom thereof is a funnel shaped header 2 formed with an enlarged axial opening 3, an upstanding annular flange 4 having its inner face aligned with the edge of opening 3, and a depending annular flange 5, with its outer face aligned with the outer edge of the body part of the header. The flange 5 is anchored against the inner face of casing 1 by the holdfast means 6. The lower end of casing 1 is mounted upon a circular plate 7 provided with an enlarged axial opening 8 and a vertically disposed annular flange 9 flush with the outer edge of the plate. The flange 9 is disposed circumferentially of the lower end of the outer periphery of casing 1. The plate 7 is seated upon a base structure 10 including an upstanding flanged means 11 and spaced supporting legs 12. The header 2 coacts with that portion of casing 1 directly thereabove and the water tank, not shown, of the heater to provide a heat receiving chamber 13. The header 2, plate 7 and a portion of casing 1 coact to provide a burner chamber 14. The opening 8 in plate 7 provides an air intake for chamber 14.

A burner 15, in accordance with this invention, is arranged within the chamber 14 and mounted on a circular plate 16 arranged over the plate 7. The plate 16 is arranged in superposed spaced and concentric relation with respect to and is of less diameter than the plate 7. The outer edge of plate 16 is formed with a set of spaced depending vertically disposed L-shaped supporting legs 18 which are anchored to plate 7 by the removable holdfast devices 19 and constitute spacers for plates 7, 16. Mounted on the plate 16, in proximity to its outer edge are horizontal flanges 20 formed on the lower ends of a series of spaced disposed supports 21 forming parts of the burner. The flanges 20 are anchored to the plate 16 by the holdfast means 22. Each support 21 is formed near its upper end with an opening 23 for a purpose to be referred to. The plate 7 adjacent opening 8 is formed with an opening 24. The plate 16 is provided with an opening 25 which aligns with the opening 24. The purpose of the openings 24, 25 will be referred to.

The burner includes a vertically disposed tube 26 having at its lower end a pair of spaced aligned angle-shaped supporting legs 27 anchored to the plate 16 by the holdfast means 28 and so disposed as to permit air passing up into the tube 26 from the lower end of the latter. Extending upwardly through the opening 8, plate 16 and into the tube 26 to align with the upper end of the latter is an oil feed or delivery pipe 29 of materially less diameter than the diameter of the tube 26. The pipe 29 is arranged in concentric spaced relation with respect to tube 26 to provide a channel or flue 30 for conducting air upwardly. The inlet of channel 30 is indicated 30a. The tube 26 intermediate its ends has its body formed with an opening 31 having its wall inclining upwardly from its inner to its outer end. The pipe 29 intermediate its ends has its body formed with an inclined opening 32 having its wall coaxially of the opening 31. Formed integral with the outer face of tube 29 is an inclined branch 33 which is also integral with the tube 26. A part of the branch 33 has its inner face flush with the wall of the opening 31. A part of the branch 33 extends through the opening 31 and projects slightly beyond the tube 26. The branch 33 is disposed at an inclination substantially to that of the inclination of the walls of the openings 31, 32. The branch 33 bridges the channel 30. The pipe 29 includes an inclined tubular extension 34 which is mounted in the branch 33 and an opening 57ª to be referred to. The extension 34 has the upper portion of its lower end arranged within the pipe 29. The extension 34 has the lower part of the upper end thereof bent downwardly in the form of a lip 35. Mounted in the extension 34 and projecting from the upper and lower ends of the extension is a wick element 36 to be more specifically referred to.

An outer burner pan is indicated generally at 37 and includes a funnel-shaped lower portion 38 and a vertically disposed annular upper portion 39. Extending through the portion 38 axially of the latter as well as being integral therewith is the tube 26. The portion 38 of the outer pan is integral with the tube 26 below the opening 31. The supports 21 are positioned against the outer face of the portion 39 of the pan 37. The said portion 39 is formed with spaced openings 40 which align with the openings 23 in the supports 21. Holdfast means 41 extend through the aligning openings 23, 40 for anchoring the pan 37 to the supports 21. Extending through and integral with the portion 38 of the pan 37 is a vertically disposed sleeve 42 having internal threads. Passing upwardly through the aligned openings 24, 25 is a rotatable vertically adjustable stem 43 having an enlarged peripherally threaded upper portion 44 for threadably engaging with the internal threads of the sleeve 42. The upper end of the portion 44 of the stem 43 is provided with a tapered extension providing a vertical coupling pin 45 for purposes to be referred to. The pin 45 is on the axis of stem 43 and is materially less diameter than the body of the latter. The lower end of the stem 43 has a hand wheel 46 arranged below the plate 7.

The tube 26 also acts to provide the inner wall of pan 37. Positioned within the latter is the inner burner pan 47 which receives the oil or fuel 48 supplied thereto from the oil delivery means consisting of the pipe 29, branch 33, extension 34 and wick element 36. The pan 47 includes a funnel-shaped portion 49 provided with a plurality of spaced angle-shaped legs 50. The portion 49 is arranged over a part of the portion 38 of the pan 37 and is spaced from said portion 38. The legs 50 act as a means for spacing the portion 49 of the pan 47 from the portion 38 of the pan 37. The part 51 of each of the legs 50 seats on and is anchored to the portion 38 of the pan 37 by the holdfast means 52. The part 53 of each of the legs 50 extends upwardly at an inward inclination from the part 51 and forms a spacer for the said portions 38, 49. The pan 47 has an axial opening 54 and formed integral with the portion 49 of pan 47 and aligning with the wall of the axial opening 54 is a vertical tube 55 disposed in encompassing spaced relation with respect to and extended upwardly beyond the upper end of the tube 26. The tube 55 provides the inner wall of the pan 47. Arranged between the tubes 26, 55 and the portions 38, 49 respectively of pans 37, 47, as well as against the leg 53 of portion 50 of the pan 47 is an insulating packing 56. The packing 56 does not extend to the top of the tubes 26, 55 whereby a space 57 is formed between the upper portion of the tubes 26, 55. The latter above the tube 26 is formed with a circumferentially extending row of spaced openings 58 constituting air outlets for the air passing upwardly through the channel 30. The tube 55 is formed with an inclined opening 57ª which aligns with the opening 31 in the tube 26. The extension 34 projects through the opening 57ª. Mounted upon the upper end and of greater diameter than the tube 55 is a circular plate 59 provided in proximity to its edge with a circular row of spaced openings 60. The top edge of tube 55 extends diametrically of the openings 60. The plate 59 provides a support for a cap piece 61 consisting of a hollow conoidal shaped upper portion 62 and an annular depending lower portion 63 formed circumferentially thereof with openings 64 of smaller diameter than the openings 58. The lower portion 63 of cap piece 61 is disposed in concentric spaced relation with respect to the upper portion of the tube 55 to form in connection with the latter a downwardly leading air channel 65 of materially less length than the channel 30. The openings 58 and openings 60 function as air intakes for the channel 65.

The burner 15 includes an upstanding vertically adjustable burner tube element 66 which is capable of slidably extending through the flange 4 on the header 2. The upper portion of the element 66 is normally disposed within the flange 4. The element 66 includes an upper section 67, an intermediate section 68 and a lower section 69. The section 67 is of less diameter than the section 69 and the section 68 is of greater diameter than the upper and lower sections of the element 66. The section 67 may be of less or greater length than section 69, preferably, is of less length than the length of section 69, and is so shown. The section 68 is in the form of an annulus 70 provided at its inner edge with a vertically disposed annular flange 71 which extends upwardly from the annulus 70. The latter at its outer edge is formed with a vertically disposed annular flange 72 which depends from the annulus. The section 67 is seated on the annulus 70. The flange 71 extends upwardly in the section 67 and snugly engages the inner face of the latter. The annulus 70 seats on the top edge of the section 69 and the flange 72 thereof bears against and encompasses the upper portion of the outer face of the section 69. The latter is of materially greater diameter than the lower portion 63 of the cap element 61 and is arranged in concentric spaced relation with respect to the said portion 63. The section 69 is of less diameter than the part of largest diameter of the portion 49 of the pan 47. The section 69 at its lower portion is provided circumferentially thereof with a row of spaced vertically disposed notches 74 opening at the bottom edge thereof for constituting air intakes. The section 69, in proximity to its upper edge is formed with a circumferentially extending row of spaced openings 75 constituting air intakes, and said sleeve between the openings 75 and the notches 74 is formed with a circumferentially extending row of spaced openings 76 constituting air intakes.

The burner 15 includes a vertically movable carrier 77 for vertically adjusting the element 66 relative to the pan 47. The carrier 77 consists of front and rear bars 78, 79 respectively disposed in parallel spaced relation and between which the section 69 of the element 66 is arranged. The bars 78, 79 are connected together by a pair of coupling devices 80, 81 of like form, each of which consists of a round bar 82 having reduced portions 83 adjacent each end for extension through the aligned openings 84 in the bars 78, 79. The ends of the portion 83 are upset as at 85 whereby the bars 78, 79, 80, 81 are coupled together. The bars 78, 79 intermediate their ends have their upper lengthwise edges formed with aligned cutouts 86. Secured to the section 69 of the element 66, at diametrically opposite points thereof, are oppositely extending shouldered pins 87 which seat in the cutouts 86. By the arrangement of the carrier 77 in connection with the pins 87, when the stem 43 is rotated in a clockwise direction, the carrier 77 will be elevated carrying the element 66 therewith, and when the stem 43 is rotated in an anticlockwise direction the carrier 77 will be lowered carrying the element 66 therewith. The bars 78, 79 at one end terminal portion thereof seat permanently in notches 88 formed in the top edge of the portion 39 of pan 37 (Figure 2). The stem 43 travels faster than the tube 66 because the ends of the bars 77, 78 opposite the ends where stem 43 operates rest permanently in the notches 88. The notches 88 keep bars 78, 79 at that end from side slipping.

The wick element 36 consists of a tubular reticulated metallic core 93 encompassed by a covering of asbestos 94.

The oil or fuel enters through the pipe 29 and passes out through branch 33 and extension 34. The element 36, which is seated in the extension 34 is formed with an axial passage provided by the core 93 thereof. The purpose of the asbestos sleeve 94 is to shield the oil supply up to the point of the delivery, and as the branch 33 is disposed at an upward inclination with respect to the pipe 29, it permits the inner end of the wick element to assist in and provide for the thirty or forty drops of oil per minute required for a pilot to continue to flow by the absorbent action of the wick element. The oil is at the very edge of the oil opening, but needs some assistance to get it over at a regular enough rate to perform continuously on low fire setting. On high fire setting, the oil flows freely through the wick element. The latter also acts to keep the small amount of oil required for low fire burning just around the wick element and bunched up close enough to withstand draft variations that would snuff out the same amount of fire if spread out more. The oil or fuel is delivered into the inner pan 47 where it is ignited, after turning the stem 43 in a direction to elevate the element 66 sufficiently to get access to the oil. After lighting, the stem 43 is turned an opposite direction until the element 66 is located at the proper distance from the pan 47 to produce the fire intensity desired. As the element 66 is lowered, the draft will pull up air through the channel or passage 30 and out through the opening 60 of plate 59 and also out through the opening 58 at the upper end of the tube 55, as well as out through the small openings 64 in cap element 61. The greater amount of air will be drawn down through passage 65 and to the center of the fire.

The air will be drawn in through the openings 75, 76, notches or openings 74 and under the element 66. The products of combustion will pass out through the sections 68 and 67 of the element 66. The notches 74 and the openings 75, 76 in connection with the section 69 of the element 60 are utilized for controlling the combustion rate. If the notches 74 were omitted and the lower edge of section 69 seated on the upper face of the body of the inner part, this would substantially prevent the passage of air from under such edge into the inner pan and into the element 66 or in other words substantially arrest passage of air from entering the fire at this point. If, by way of example, the openings were only $\frac{1}{16}$" in diameter, then only as much air as could pass through a $\frac{1}{16}$" hole would get to the fire in element 66. If, by way of example, the openings 75 were $\frac{3}{8}$" in diameter, then an amount of air would get to the fire at their elevation greater than the amount of air at the height where openings 76 are located, consequently the rate of combustion would be slow and lazy below openings 75, and the combustion sped up as air enters through the openings 75 at their highest elevation. The openings 75 not only provide for the speeding of the combustion rate, but also for speeding up the expansion rate irrespective of any difference in size of the parts 67, 69 of the element 66. The explanation relative to the notches 74 and openings 75, 76 sets forth the speeding up or greater rapidity of burning, or whether the heat is held intense at the base of the fire, or strung up vertically by admitting more or less air at higher levels.

The arrangement of setting up the inner pan 47 insulated from the pan 37 permits a much higher temperature to exist in pan 47 than in pan 37 thereby greatly reducing the heat transfer to the oil delivery means.

Air being drawn up through channel 30, which is between the tube 26 and pipe 29 and out under element 61, tends to keep pipe 29 and branch 33 cool. The pipe 29 is shielded from side heat by what may be termed three metal partitions provided by the tube 26, tube 55 and element 61 and it is also shielded by the two air spaces formed by the channel 30 and passage 65, as well as the insulation material between tubes 26 and 55. The upper end of the pipe 29 is shielded by what may be termed two metal partitions, one provided by the element 61 and the other by the plate 59. The top of the pipe 29 is also shielded by the air spaces between the plate 59 and upper end of such plate and the air space between the plate 59 and the conoidal-shaped portion 62 of element 61.

With reference to the form of burner shown by Figures 11 and 12 the pan 98 is of the same form as pan 37. The inner pan 99 is of the same contour as pan 98 but of smaller size and is arranged in superposed spaced relation with respect to pan 98. The top edges of the pans 98, 99 align. The top of pan 99 is formed with outwardly directed spaced radially disposed angle-shaped suspension members 100 therefor which overlap and seat upon the top edge of pan 98. The sleeve 101 in the form shown in Figure 11 and which corresponds to the sleeve 42, not only extends upwardly through pan 98 but also extends upwardly through pan 99. The arranging of the pans 98, 99 in the manner as shown provides a space 102 therebetween opening at the top of the pans. The space 102 may or may not be filled with a packing of insulation or used for the admission of air to below the center of the fire to provide for insulation with respect to the pan 98 and oil conducting pipe 103. The vertical tubes which are integral with the pans 98, 99 are indicated at 104, 105 respectively. The wick element, branch and extension are designated 106, 107, 108 respectively. Otherwise than as stated the form shown in Figures 11 and 12 will be the same as the form shown in Figure 1.

With respect to the adjustment of element 66 by screw 43, let it be understood that element 66 is only adjusted for about ½" elevation, and while the screw 43 is forcing the carrier 77 up at the end where screw 43 engages it, the opposite end of carrier 77 rests in notches and is drawn slightly towards the screw and does pull the bottom of element 66 over a few thousandths of an inch when elevated to its greatest height, but normally the element 66 is substantially about level. The pins or carrier lugs 87 are placed in element 66 so that element 66 does not have to be moved up or down very much. Also there is 3/32" clearance between the outside of part 67 of element 66 and flange 4 to take care of expansion and a little out of roundness.

Owing to the large area of element 66, a slight movement up or down makes considerable difference in the intensity and quality of the fire. The element 66 never has to be raised to any great extent. The extent of the raise is small.

The form of burner shown by Figures 13 to 15 includes an outer pan generally indicated at 109 and formed of a vertically disposed axially arranged central tubular part 110 having an upper portion, 111 having a tapered outer periphery formed with threads, an annular tapered inner intermediate portion 112 surrounding the part 110 and merging at its upper end into the outer periphery of the lower end of the portion 111 of the part 110, a vertically disposed tubular part 113 merging at its upper end into the lower end of the part 110 and forming in connection with the latter an oil feed pipe, a funnel-shaped outer intermediate part 114, which at its lower end merges into the lower end of the part 112, a vertically disposed annular upper portion 115 of uniform diameter merging at its lower end into the upper end of the part 114, an opening 116 formed at the point of mergence of the parts 112, 114, an outwardly inclined drain pipe 117 leading downwardly from opening 116 and an opening 118 formed in the part 114.

Extending upwardly through opening 118 and connected to the part 114 of pan 109 is an internally threaded sleeve 119 of the same form and for the same purpose as the sleeves 42 and 101.

The form of burner shown in Figures 13 to 15 includes an inner pan 120 arranged over pan 109 and formed of an annular flared upstanding inner part 121, an outwardly directed circular intermediate part 122 merging into the lower end of and extending at an upward inclination from said end of part 121 and an upper part 123 formed of a series of spaced sections integral with the upper end of part 122 and depending from the latter at an outward inclination. Each of the sections of the part 123 is of angled contour and includes an upstanding leg 124 and a horizontal leg 125 which is secured to the upper face of the part 114 of pan 109. The latter is of greater diameter than pan 120. The legs 124 of part 123 maintain the parts 121, 122 of the pan 120 in spaced relation relative to the parts 110, 112 and 114 of the pan 109. The pan 120 coacts with the parts 110, 112 and 114 of the pan 109 to provide an annular, flared air receiving chamber 126 which is open at its inner side, open at its outer side, open at its top and having the opening 116 in its bottom. The oil or fuel 127 is received in the lower portion of pan 120. The air is drawn in the direction as indicated by the arrows.

Detachably connected to and threadably engaging with the portion 111 of the part 110 of the pan 109 is an oil spreading cap assembly 128 for delivering the oil in the pan 120. The assembly 128 is of circular form and of a diameter to extend over the pan 120. The assembly 128 includes a metallic annulus 129 formed with threads on its inner edge, a depending internally threaded flange 130 forming a depending continuation of the said inner edge and a flange 131 depending from the outer edge of the annulus. The inner edge of the annulus 129 and the inner face of flange 130 are inversely tapered. Mounted on the annulus 129 is an inverted cup-shaped member 132 formed of absorbent material such as asbestos. The bottom edge of member 132 is flush with the bottom edge of flange 131. Mounted on and flush with the bottom edge of member 132 is an inverted cup-shaped metallic member 133. When the assembly is positioned on the pan 109 the upper end of the part 110 of the latter abuts the member 132. The latter extends across the upper open end of the central part 110 of the pan 109.

Snugly engaging in the upper portion of part 113 and throughout the part 110 of pan 109, as well as abutting the member 132 is a tubular wick element 134, consisting of an inner tubular reticulated metallic core 135 and a sleeve-like body 136 possessing an absorbent characteristic encompassing the core 135. The latter forms the element 134 with an axial passage.

The burner 140 as shown in Figures 13 to 15 includes a burner tube element 114 which is to correspond in form to the element 66 of the burner shown in Figure 1. Only the lower section of element 140 is shown. Otherwise than that as stated the burner 140 will be of the same construction as the burner 15.

What I claim is:

1. In a liquid fuel burner, an inner pan formed with an upstanding tubular inner wall, an outer pan arranged below and disposed in relation to the inner pan to provide a space between the pans, said outer pan being formed with an upstanding tubular inner wall extending into and arranged in concentric spaced relation to the inner wall of the inner pan, an oil delivery means having a part arranged within the inner wall of the outer pan and another part extending through the said walls of said pans for delivering fuel to the inner pan, the inner wall of the inner pan extended above the upper end of the inner wall of the outer pan and having its extended portion formed with openings, the inner wall of the outer pan being extended below the lower end of the inner wall of the inner pan, and a perforated cap assembly seated on the upper end of and having a depending part disposed exteriorly of and in concentric spaced relation with respect to the upper portion of the inner wall of the inner pan.

2. In a liquid fuel burner, an inner pan formed with an upstanding tubular inner wall, an outer pan arranged below and disposed in relation to the inner pan to provide a space between the pans, said outer pan being formed with an upstanding tubular inner wall extending into and arranged in concentric spaced relation to the inner wall of the inner pan, an oil delivery means having a part arranged within the inner wall of the outer pan and another part extending through the said walls of said pans for delivering fuel to the inner pan, the inner wall of the inner pan extending above the upper end of the inner wall of the outer pan and having its extended portion formed with openings, the lower portion of the inner wall of the outer pan depending below the lower end of the inner wall of the inner pan, a perforated cap assembly seated on the upper end of and having a depending part disposed exteriorly of and in concentric spaced relation with respect to the upper portion of the inner wall of the inner pan, and an upstanding burner tube element including an annular lower section depending into said inner pan and encompassing in spaced relation said depending part, said annular lower section provided with notches throughout its lower edge and spaced circumferentially extending spaced openings arranged above said notches.

3. In a liquid fuel burner, an inner pan formed with an upstanding tubular inner wall, an outer pan arranged below and disposed in relation to the inner pan to provide a space between the pans, said outer pan being formed with an upstanding tubular inner wall extending into and arranged in concentric spaced relation to the inner wall of the inner pan, an oil delivery means having a part arranged within the inner wall of the outer pan and another part extending through the said walls of said pans for delivering fuel to the inner pan, the inner wall of the inner pan extending above the upper end of the inner wall of the outer pan and having its extended portion formed with openings, the lower portion of the inner wall of the outer pan depending below the lower end of the inner wall of the inner pan, a perforated cap assembly seated on the upper end of and having a depending part disposed exteriorly of and in concentric spaced relation with respect to the upper portion of the inner wall of the inner pan, and an upstanding burner tube element including an annular lower section depending into said inner pan and encompassing in spaced relation said depending part, said annular lower section provided with notches throughout its lower edge and spaced circumferentially extending spaced openings arranged above said notches, said inner pan being of less diameter than said outer pan, a body of insulation arranged between said inner walls, and a filling of insulation within the said space between the pans.

4. In a liquid fuel burner, an inner pan formed with an upstanding tubular inner wall, an outer pan arranged below and disposed in relation to the inner pan to provide a space between the pans, said outer pan being formed with an upstanding tubular inner wall extending into and arranged in concentric spaced relation to the inner wall of the inner pan, an oil delivery means having a part arranged within the inner wall of the outer pan and another part extending through the said walls of said pans for delivering fuel to the inner pan, the inner wall of the inner pan extending above the upper end of the inner wall of the outer pan and having its extended portion formed with openings, the lower portion of the inner wall of the outer pan depending below the lower end of the inner wall of the inner pan, a perforated cap assembly seated on the upper end of and having a depending part disposed exteriorly of and in concentric spaced relation with respect to the upper portion of the inner wall of the inner pan, a vertically adjustable burner tube element encompassing in spaced relation said assembly and including an annular lower section provided with notches throughout its lower edge and circumferentially extending spaced openings arranged above said notches, a carrier for said burner tube element, and means for vertically adjusting the carrier.

5. In an oil burner, upstanding outer and inner tubes disposed in concentric spaced relation, having their lower ends open and formed with aligned openings intermediate their ends, said outer tube being extended above the inner tube, said inner tube depending below the outer tube, outer and inner superposed horizontally disposed pans, each formed with an axial opening, the edge of the opening of the outer pan merging into the inner tube in proximity to the lower end of the latter, the edge of the opening of the inner pan merging into the lower end of the outer tube, an oil delivery pipe extending upwardly within and disposed in concentric spaced relation to said inner tube, said pipe intermediate its ends including a tubular branch having a part registering with and a part extending through the opening in the inner tube, a tubular extension mounted in said branch, extending through the openings in the tubes and projecting into said pipe and beyond said outer tube; a wick element positioned in said extension, insulating means arranged between said pans and said tubes, said extension passing through said insulating means, said outer tube being formed with openings in proximity to its upper end, and an apertured cap assembly supported by the upper end of and having a part disposed in concentric spaced relation to the upper portion of said outer tube.

6. In an oil burner, upstanding outer and inner tubes disposed in concentric spaced relation having their lower ends open and formed with aligned openings intermediate their ends, said outer tube being extended above the inner tube, said inner tube depending below the outer tube, outer and inner superposed horizontally disposed pans, each formed with an axial opening, the edge of the opening of the outer pan merging into the inner tube in proximity to the lower end of the latter, the edge of the opening of the inner pan merging into the lower end of the outer tube, an oil delivery pipe extending upwardly within and disposed in concentric spaced relation to said inner tube, said pipe intermediate its ends including a tubular branch having a part registering with and a part extending through the opening in the inner tube, a tubular extension mounted in said branch, extending through the openings in the tubes and projecting into said pipe and beyond said outer tube; a wick element positioned in said extension, insulating means arranged between said pans and said tubes, said extension passing through said insulating means, said inner tube being formed with openings in proximity to its upper end, and an apertured cap assembly supported by the upper end of and having a part disposed in concentric spaced relation to the upper portion of said inner tube, the lower portion of the outer end of the extension being formed with a depending lip overhanging the inner pan.

7. In a liquid fuel burner, an outer pan formed respectively of a body part having an axial opening and an upstanding tubular part integral with the walls of said opening extending above said body part and constituting the inner wall of said pan, an inner pan within the outer pan and formed respectively of a body part having an axial opening and an upstanding tubular part integral at its lower end with the wall of the opening in the body part of the inner pan and constituting the inner wall of the latter, the inner wall of the inner pan being disposed in encompassing spaced relation with respect to, extending above the upper end of and arranged above the lower end of the inner wall of the outer pan, the inner wall of the inner pan being formed with spaced openings positioned above the inner wall of the outer pan, the inner wall of the outer pan being formed intermediate its ends with an upstanding inclined opening, the inner wall of the inner pan being formed in proximity at its lower end with an upwardly inclined opening aligned with the opening in the inner wall of the outer pan, and an oil delivery means having a vertical part arranged in the inner wall of the outer pan and an upwardly inclined part extending through said aligned opening for delivering fuel to the inner pan.

8. In a liquid fuel burner, an inner pan including a bottom formed axially thereof with an upstanding tubular inner wall open at each end, an outer pan including a bottom having a part thereof arranged below and disposed in spaced relation to the bottom and lower end of the inner wall of said inner pan to provide a space between said pans, said outer pan having its bottom formed axially thereof with an upstanding tubular inner wall open at each end extending into and spaced from the inner wall of the inner pan, said walls being disposed in co-axial relation, said outer pan having a vertically disposed upper portion encompassing in spaced relation the upper portion of the inner wall of the inner pan, a fuel delivery means having a tubular part arranged within, spaced from and disposed in co-axial relation with respect to the inner wall of the outer pan, said means including another tubular part leading from the said other tubular part intermediate to the ends of the latter extending through the said inner wall intermediate the ends of the latter and opening into the inner pan in proximity to the bottom of the latter, a body of insulation arranged between the bottoms of said pan and encompassing the inner wall of the outer pan, and a body of insulation arranged between and spaced from the upper ends of said inner walls.

9. In a fuel burner, a fuel receiving and vaporizing element, a burner tube arranged over said element and including vertically disposed cylindrical upper and lower parts, the upper part being of less diameter than the diameter of the lower part, said parts being disposed in co-axial relation, said lower part being formed intermediate its ends with diametrically disposed laterally extending studs, a frame-like suspension for said tube and through which extends the said lower part, said studs being seated in the sides of said suspension, said suspension at one side overlapping a part of the top edge of said element, and a structure connected to the other end of the suspension and extending downwardly through said element and constituting means for vertically shifting said suspension thereby vertically adjusting said tube.

10. In a fuel burner, a fuel receiving and vaporizing element, a burner tube arranged over said element and including vertically disposed cylindrical upper and lower parts, the upper part being of less diameter than the diameter of the lower part, said parts being disposed in co-axial relation, said lower part being formed intermediate its ends with diametrically disposed laterally extending studs, a frame-like suspension for said tube and through which extends the said lower part, said studs being seated in the sides of said suspension, said suspension at one side overlapping a part of the top edge of said element, and a structure connected to the other end of the suspension and extending downwardly through said element and constituting means for vertically shifting said suspension thereby vertically adjusting said tube, said lower part of said tube having its bottom edge formed throughout with spaced notches.

11. In a fuel burner, a fuel receiving and vaporizing element, a burner tube arranged over said element and including vertically disposed cylindrical upper and lower parts, the upper part being of less diameter than the diameter of the lower part, said parts being disposed in co-axial relation, said lower part being formed intermediate its ends with diametrically disposed laterally extending studs, a frame-like suspension for said tube and through which extends the said lower part, said studs being seated in the sides of said suspension, said suspension at one side overlapping a part of the top edge of said element, and a structure connected to the other end of the suspension and extending downwardly through said element and constituting a means for vertically shifting said suspension thereby vertically adjusting said tube, said lower part of said tube being formed intermediate its ends with circumferentially disposed openings.

12. In a fuel burner, a fuel receiving and vaporizing element, a burner tube arranged over said element and including vertically disposed cylindrical upper and lower parts, the upper part being of less diameter than the diameter of the lower part, said parts being disposed in co-axial relation, said lower part being formed intermediate its ends with diametrically disposed laterally extending studs, a framelike suspension for said tube and through which extends the said lower part, said studs being seated in the sides of said suspension, said suspension at one side overlapping a part of the top edge of said element, and a structure connected to the other end of the suspension and extending downwardly through said element and constituting a means for vertically shifting said suspension thereby vertically adjusting said tube, said lower part of said tube having its bottom edge formed throughout with spaced notches and further formed intermediate its ends with a circumferential row of spaced openings.

GEORGE W. WHITEHURST.